(12) United States Patent
Kobayashi (10) Patent No.: US 10,900,554 B2
(45) Date of Patent: Jan. 26, 2021

(54) VEHICLE TRANSFER

(71) Applicant: TOYOTA JIDOSHA KABUSHIKI KAISHA, Toyota (JP)

(72) Inventor: Takahide Kobayashi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/430,797

(22) Filed: Jun. 4, 2019

(65) Prior Publication Data

US 2019/0376594 A1 Dec. 12, 2019

(30) Foreign Application Priority Data

Jun. 8, 2018 (JP) ................................. 2018-110600

(51) Int. Cl.
| | | |
|---|---|---|
| *B60K 17/344* | (2006.01) | |
| *B60K 17/35* | (2006.01) | |
| *B60K 23/08* | (2006.01) | |
| *F16H 57/027* | (2012.01) | |
| *F16H 57/04* | (2010.01) | |

(52) U.S. Cl.
CPC ......... *F16H 57/027* (2013.01); *B60K 17/344* (2013.01); *F16H 57/0421* (2013.01)

(58) Field of Classification Search
CPC ... B60K 17/344; B60K 17/35; B60K 23/0808
See application file for complete search history.

(56) References Cited

U.S. PATENT DOCUMENTS

2016/0107523 A1* 4/2016 Maeda ................... B60K 17/02
180/245

FOREIGN PATENT DOCUMENTS

JP 2008-164123 A 7/2008

* cited by examiner

*Primary Examiner* — Paul J Gray
(74) *Attorney, Agent, or Firm* — Oliff PLC (57) ABSTRACT

A vehicle transfer comprises: a ring gear and a pinion gear; a transfer casing; and a bearing. The transfer casing includes a breather chamber that is partitioned by a partition wall with respect to a gear chamber and that is allowed to communicate with the gear chamber through a communication hole formed in the partition wall to adjust a pressure in the transfer casing, and a lubricating oil passage for supplying the oil to the bearing. The communication hole is disposed at a position to which the oil scooped up by the pinion gear is directed, and the vehicle transfer includes an oil receiver including a vertical wall portion preventing the oil scooped up by the pinion gear from flowing into the communication hole and a horizontal wall portion capturing the oil scooped up by the pinion gear and causing the captured oil to flow toward the lubricating oil passage.

11 Claims, 8 Drawing Sheets

VEHICLE TRANSFER

The disclosure of Japanese Patent Application No. 2018-110600 filed on Jun. 8, 2018 including the specification, drawings and abstract is incorporated herein by reference in its entirety.

FIELD OF THE INVENTION

The present invention relates to a structure of a vehicle transfer including a breather chamber in a transfer casing.

DESCRIPTION OF THE RELATED ART

A structure for a vehicle transfer included in a vehicle is proposed which includes a breather chamber for adjusting pressure in a transfer casing, and a lubricating oil passage for supplying oil to a bearing rotatably supporting a pinion gear on the transfer casing. This corresponds to a transfer of Patent Document 1.

PRIOR ART DOCUMENT

Patent Document

Patent Document 1: Japanese Laid-Open Patent Publication No. 2008-164123

SUMMARY OF THE INVENTION

Technical Problem

If a communication hole allowing communication between the breather chamber and a gear chamber housing the pinion gear is disposed at a position to which an oil scooped up and splashed by the pinion gear is directed, the scooped oil may flow through the communication hole into the breather chamber, and the oil may flow from the breather chamber to the outside. Additionally, a restriction on the shape of the transfer casing causes a problem of an insufficient amount of the oil flowing through the lubricating oil passage.

The present invention was conceived in view of the situations and it is therefore an object of the present invention to provide a structure, to suppress an inflow of oil into the breather chamber and ensuring a lubricating oil amount of oil flowing through a lubricating oil passage in a vehicle transfer including a breather chamber in a transfer casing.

Solution to Problem

A first aspect of the present invention provides a vehicle transfer comprising: (a) a ring gear and a pinion gear orthogonally arranged and meshed with each other for transmitting a power; a transfer casing housing the ring gear and the pinion gear and enclosing an oil; and a bearing rotatably supporting the pinion gear on the transfer casing, wherein (b) the transfer casing includes therein a breather chamber that is partitioned by a partition wall with respect to a gear chamber housing the pinion gear and that is allowed to communicate with the gear chamber through a communication hole formed in the partition wall to adjust a pressure in the transfer casing, and a lubricating oil passage for supplying the oil to the bearing, wherein (c) the communication hole is disposed at a position to which the oil scooped up by the pinion gear is directed, and wherein (d) the vehicle transfer includes an oil receiver including a vertical wall portion preventing the oil scooped up by the pinion gear from flowing into the communication hole and a horizontal wall portion capturing the oil scooped up by the pinion gear and causing the captured oil to flow toward the lubricating oil passage.

A second aspect of the present invention provides the vehicle transfer recited in the first aspect of the invention, wherein (a) the transfer casing is provided with an oil receiving portion connected to the lubricating oil passage and receiving the oil captured by the horizontal wall portion, and wherein (b) the horizontal wall portion is provided with a guide portion guiding the captured oil to the oil receiving portion.

A third aspect of the present invention provides the vehicle transfer recited in the second aspect of the invention, wherein the horizontal wall portion is inclined downward relative to a horizontal line as the horizontal wall portion extends toward the side provided with the guide portion.

A fourth aspect of the present invention provides the vehicle transfer recited in any one of the first to third aspects of the invention, wherein (a) the oil receiver is disposed on a cover disposed at the position to which the oil scooped up by the pinion gear is directed, wherein (b) the vertical wall portion is disposed to face the pinion gear, wherein (c) the communication hole is located on a back side of a wall surface of the vertical wall portion facing the pinion gear, and wherein (d) the horizontal wall portion is extended perpendicularly from the wall surface of the vertical wall portion.

A fifth aspect of the present invention provides the vehicle transfer recited in the fourth aspect of the invention, wherein the breather chamber is formed by being surrounded by a recess portion that is formed in a wall surface of the partition wall on a back side of a wall surface facing the gear chamber and that is connected to the communication hole and the cover attached to the wall surface on the back side.

Advantageous Effects of Invention

According to the vehicle transfer recited in the first aspect of the invention, even when the communication hole allowing the breather chamber to communicate with the gear chamber is disposed at a position to which the oil scooped up by the pinion gear is directed, the inflow of oil to the communication hole is blocked by the vertical wall portion, so that the scooped oil is prevented from flowing out through the communication hole. Additionally, since the scooped oil is captured by the horizontal wall portion and the captured oil is supplied to the lubricating oil passage, an amount of the oil flowing through the lubricating oil passage can be ensured.

According to the vehicle transfer recited in the second aspect of the invention, the oil captured by the horizontal wall portion is guided by the guide portion and supplied to the oil receiving portion formed in the transfer casing. Therefore, the captured oil can efficiently be supplied to the lubricating oil passage.

According to the vehicle transfer recited in the third aspect of the invention, the horizontal wall portion is inclined downward relative to the horizontal line as the horizontal wall portion extends toward the side provided with the guide portion. Therefore, the oil captured by the horizontal wall moves toward the guide portion due to its own weight. Therefore, the oil captured by the horizontal wall can be moved toward the guide portion.

According to the vehicle transfer recited in the fourth aspect of the invention, the oil scooped up by the pinion gear hits on the vertical wall portion, so that the oil is prevented from flowing into the communication hole located on the back side of the vertical wall portion. The oil hitting on the vertical wall is captured by the horizontal wall.

According to the vehicle transfer recited in the fifth aspect of the present invention, the cover is attached to the wall surface of the partition wall located on the back of the gear chamber and provided with the recess portion, so that the breather chamber surrounded by the recess portion and the cover and communicating with the communication hole is easily formed.

MODES FOR CARRYING OUT THE INVENTION

An example of the present invention will now be described in detail with reference to the drawings. In the following example, the figures are simplified or deformed as needed and portions are not necessarily precisely drawn in terms of dimension ratio, shape, etc.

EXAMPLE

Figure 1:
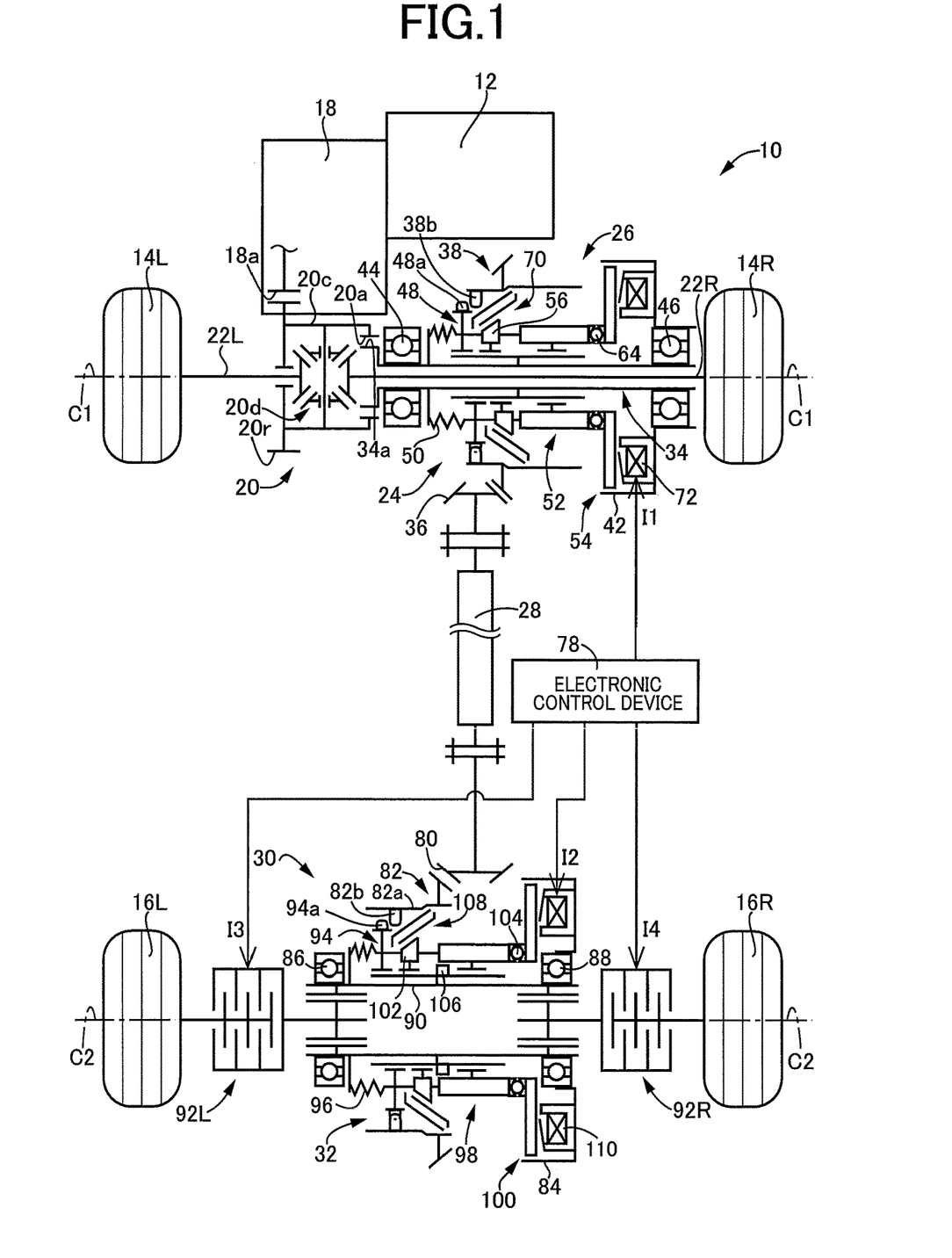
FIG. 1 is a skeleton diagram for generally explaining a configuration of a four-wheel-drive vehicle to which the present invention is preferably applied.

FIG. 1 is a skeleton diagram for generally explaining a configuration of a four-wheel-drive vehicle 10 to which the present invention is preferably applied. In FIG. 1, the four-wheel-drive vehicle 10 includes a four-wheel-drive device of an FF type having a first power transmission path transmitting a drive power of an engine 12 serving as a drive power source to left and right front wheels 14L, 14R corresponding to main drive wheels and a second power transmission path transmitting the drive power of the engine 12 to left and right rear wheels 16L, 16R corresponding to auxiliary drive wheels. In a two-wheel-drive state of the four-wheel-drive vehicle 10, the drive power transmitted from the engine 12 via an automatic transmission 18 is transmitted to the left and right front wheels 14L, 14R through a front-wheel drive-power distributing device 20 and left and right front wheel axles 22L, 22R. In this two-wheel-drive state, at least a first clutch 24 disposed in a transfer 26 is released, and no drive power is transmitted to a propeller shaft 28 as well as a rear-wheel drive-power distributing device 30 and the rear wheels 16L, 16R. However, in a four-wheel-drive state, the first clutch 24 and a second clutch 32 are both engaged in addition to the two-wheel-drive state, and a portion of the drive power from the engine 12 is transmitted to the rear wheels 16L, 16R through the propeller shaft 28, the rear-wheel drive-power distributing device 30, etc.

As shown in FIG. 1, the front-wheel drive-power distributing device 20 has a ring gear 20r rotatably disposed around a first rotation axis C1 and meshed with an output gear 18a of the automatic transmission 18, a differential casing 20c fixed to the ring gear 20r, and a differential gear mechanism 20d housed in the differential casing 20c, and transmits the drive power transmitted to the ring gear 20r to the left and right front wheel axles 22L, 22R while allowing differential rotation between the left and right front wheel axles 22L, 22R coupled to the front wheels 14L, 14R. The differential casing 20c is provided with inner-circumferential meshing teeth 20a fitted to first outer-circumferential spline teeth 34a formed at an end portion on the differential casing 20c side of a cylindrical input shaft 34 disposed in the transfer 26.

Figure 2:
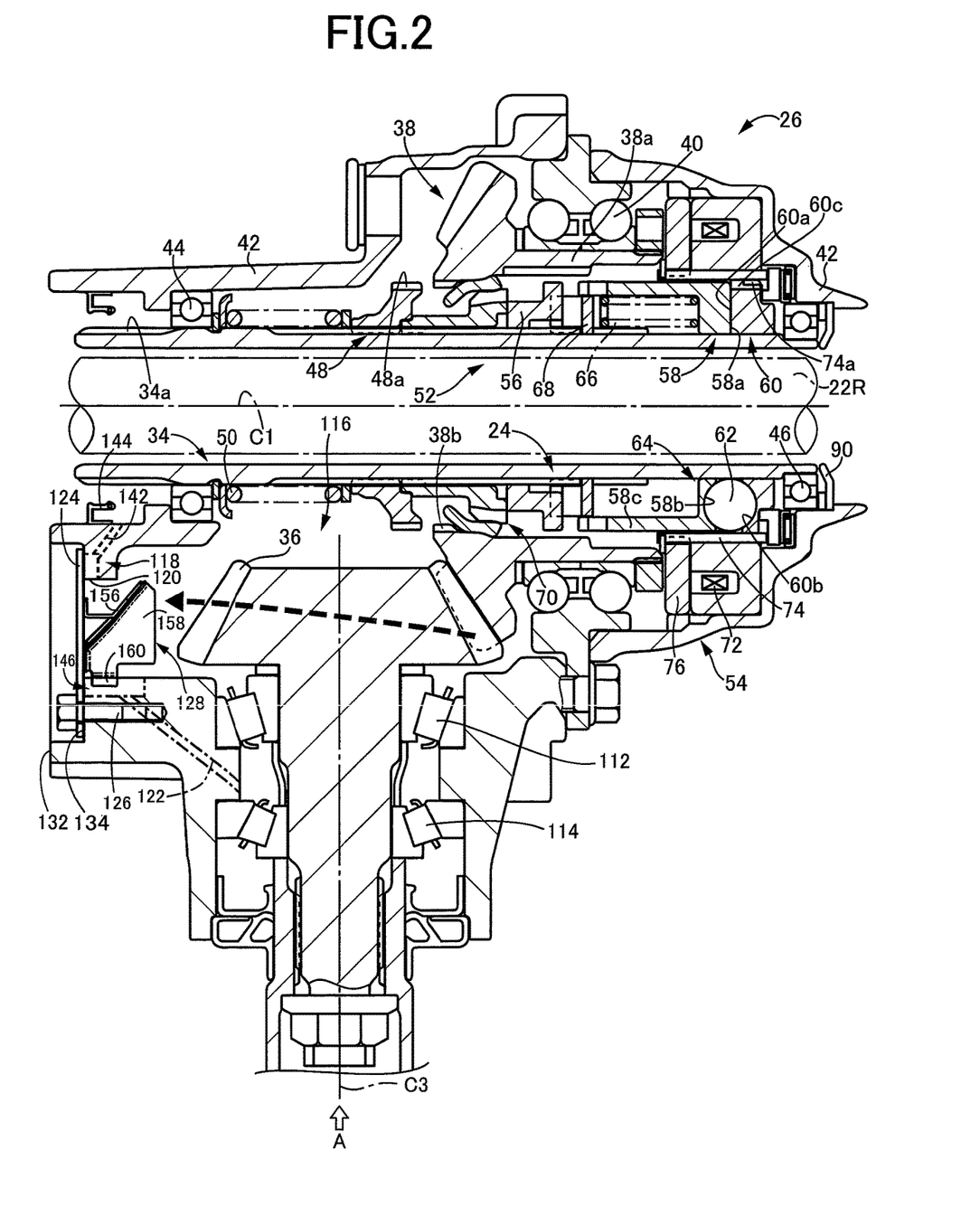
FIG. 2 shows a cross-sectional view of a transfer of FIG. 1.

FIG. 2 shows a cross-sectional view of the transfer 26. As shown in FIGS. 1 and 2, the transfer 26 includes: a cylindrical first ring gear 38 meshed with a driven pinion gear 36 coupled to an end portion of the propeller shaft 28 on the side of the front wheels 14L, 14R; the cylindrical input shaft 34 to which a portion of the drive power transmitted from the engine 12 through the differential casing 20c to the front wheels 14L, 14R is input; and the first clutch 24 connecting/disconnecting a power transmission path between the differential casing 20c and the propeller shaft 28, i.e., between the input shaft 34 coupled to the differential casing 20c and the first ring gear 38 coupled to the propeller shaft 28, in the power transmission path from the engine 12 to the propeller shaft 28, so that when the first clutch 24 is engaged and a power transmission path between the input shaft 34 and the first ring gear 38 is established, a portion of the drive power transmitted from the engine 12 is output through the propeller shaft 28 etc. to the left and right rear wheels 16L, 16R. The driven pinion gear 36 corresponds to a pinion gear of the present invention, and the first ring gear 38 corresponds to the ring gear of the present invention.

As shown in FIG. 2, the first ring gear 38 is a bevel gear having helical teeth or a hypoid gear formed thereon, for example. The first ring gear 38 is rotatably disposed around the first rotation axis C1. The first ring gear 38 includes a cylindrical portion 38a formed into a cylindrical shape, and first inner-circumferential connecting/disconnecting teeth 38b formed on a radially inner side of an end portion of the cylindrical portion 38a on the front wheel 14L side. The cylindrical portion 38a is rotatably supported by a transfer casing 42 via a bearing 40. Therefore, the first ring gear 38 is rotatably supported by the transfer casing 42 via the bearing 40 around the first rotation axis C1.

As shown in FIG. 2, the input shaft 34 penetrates the inside of the cylindrical portion 38a of the first ring gear 38. Both end portions of the input shaft 34 are supported by the transfer casing 42 via bearings 44 and 46 respectively, so that the input shaft 34 is supported rotatably around the first rotation axis C1.

The first clutch 24 is a connecting/disconnecting mechanism for connecting/disconnecting the power transmission path between the input shaft 34 and the first ring gear 38 in the transfer 26. The first clutch 24 includes a first connecting/disconnecting sleeve 48 disposed movably in the first rotation axis C1 direction relative to the input shaft 34 and relatively non-rotatably with respect to the input shaft 34 and having first outer-circumferential connecting/disconnecting teeth 48a formed on an outer circumference, a coil-shaped return spring 50 urging the first connecting/disconnecting sleeve 48 in the first rotation axis C1 direction toward the front wheel 14R, a first movement mechanism 52 moving the first connecting/disconnecting sleeve 48 in the first rotation axis C1 direction, and a first electromagnetic actuator 54 for driving the first movement mechanism 52.

The first connecting/disconnecting sleeve 48 is formed into an annular shape and has an inner circumferential portion spline-fitted to the input shaft 34. Therefore, the first connecting/disconnecting sleeve 48 is relatively non-rotatable, and relatively movable in the first rotation axis C1 direction, with respect to the input shaft 34. When the first connecting/disconnecting sleeve 48 is moved in the first rotation axis C1 direction to a position where the first outer-circumferential connecting/disconnecting teeth 48a are meshed with the first inner-circumferential connecting/disconnecting teeth 38b of the first ring gear 38 (hereinafter referred to as a first meshing position), the first ring gear 38 and the input shaft 34 are connected in a power transmittable manner. Therefore, the first meshing position of the first connecting/disconnecting sleeve 48 is a position at which the first clutch 24 is connected (engaged). When the first connecting/disconnecting sleeve 48 is moved in the first rotation axis C1 direction to a position where the meshing is released between the first outer-circumferential connecting/disconnecting teeth 48a and the first inner-circumferential connecting/disconnecting teeth 38b of the first ring gear 38 (hereinafter referred to as a first non-meshing position), the power transmission between the first ring gear 38 and the input shaft 34 is interrupted. Therefore, the first non-meshing position of the first connecting/disconnecting sleeve 48 is a position at which the first clutch 24 is disconnected (released).

The return spring 50 is interposed between the bearing 44 and the first connecting/disconnecting sleeve 48 in a pre-loaded state, and the first connecting/disconnecting sleeve 48 is urged by the return spring 50 in the first rotation axis C1 direction toward the front wheel 14R.

The first movement mechanism 52 includes: a first piston 56 disposed relatively rotatably around the first rotation axis C1 and relatively movably in the first rotation axis C1 direction, with respect to the input shaft 34; a first ball cam 64 configured to include a first cam member 58, a second cam member 60, and a first spherical rolling element 62; a return spring 66 urging the first cam member 58 toward the second cam member 60; and a first holder 68 provided with two types of latching teeth and disposed relatively non-rotatably, and relatively non-movably in the first rotation axis C1 direction, with respect to the input shaft 34 to latch the first piston 56 with the latching teeth. The first movement mechanism 52 further includes a first synchronizing device 70 synchronizing rotation speed of the first connecting/disconnecting sleeve 48 and rotation speed of the first ring gear 38 in a transition period when the first connecting/disconnecting sleeve 48 moves from the front wheel 14R side to the front wheel 14L side. The first synchronizing device 70 is disposed between the first connecting/disconnecting sleeve 48 and the first ring gear 38.

The first cam member 58 constituting the first ball cam 64 is configured relatively non-rotatably, and relatively movably in the first rotation axis C1 direction, with respect to the input shaft 34. The second cam member 60 is configured relatively rotatably with respect to the input shaft 34. The first cam member 58 and the second cam member 60 are arranged to face each other across the first spherical rolling element 62 in the first rotation axis C1 direction. Cam grooves 58b, 60b are respectively formed on mutually facing surfaces 58a, 60a of the first cam member 58 and the second cam member 60, and the first spherical rolling element 62 is fitted in each of the cam grooves 58b, 60b. The groove shapes of the cam grooves 58b, 60b are determined such that the relative rotation of the first cam member 58 and the second cam member 60 changes portions of the cam grooves 58b, 60b brought into contact with the first spherical rolling element 62 and thereby moves the first cam member 58 toward the first piston 56.

As shown in FIG. 2, the first electromagnetic actuator 54 includes an annular first electromagnetic coil 72 integrally fixed to the transfer casing 42, a cylindrical member 74 rotatably supported around the first rotation axis C1 with respect to the transfer casing 42, and an annular first movable piece 76 disposed on the outer circumferential side of the cylindrical member 74 adjacently to the first electromagnetic coil 72. The first movable piece 76 is disposed relatively non-rotatably with respect to the cylindrical member 74 and movably in the first rotation axis C1 direction relative to the cylindrical member 74. An inner circumference surface of the cylindrical member 74 is provided with inner-circumferential spline teeth 74a meshed with outer-circumferential spline teeth 60c formed on an outer circumference surface of the second cam member 60. When the inner-circumferential spline teeth 74a of the cylindrical member 74 are meshed with the outer-circumferential spline teeth 60c of the second cam member 60, the cylindrical member 74 becomes relatively non-rotatable, and movable in the first rotation axis C1 direction, with respect to the second cam member 60. An inner circumferential surface of the first cam member 58 is provided with inner-circumferential meshing teeth (not shown) meshed with outer-circumferential spline teeth formed on the input shaft 34. Therefore, the first cam member 58 is relatively non-rotatable, and movable in the first rotation axis C1 direction, with respect to the input shaft 34.

In the first electromagnetic actuator 54 configured as described above, for example, when the first movable piece 76 is attracted to the first electromagnetic coil 72 due to a first drive current I1 supplied from an electronic control device 78 (see FIG. 1) to the first electromagnetic coil 72 while the vehicle is running and the input shaft 34 is rotating around the first rotation axis C1, a braking torque is applied to the second cam member 60 via the cylindrical member 74. Therefore, the first cam member 58 and the second cam member 60 relatively rotate, and the first cam member 58 moves in the first rotation axis C1 direction toward the first piston 56 against urging force of the return spring 66. Additionally, the first connecting/disconnecting sleeve 48 is moved to the front wheel 14L side in conjunction with the first piston 56. Furthermore, when the first electromagnetic actuator 54 is switched from an activated state to a deactivated state by the electronic control device 78, the first connecting/disconnecting sleeve 48 and the first piston 56 are moved to the front wheel 14R side by urging force of the return spring 50, and the first cam member 58 is moved in the direction toward the second cam member 60 by the urging force of the return spring 66. When the first piston 56 is moved to the front wheel 14R side, the first piston 56 is latched on one of the latching teeth formed on the first holder 68.

The first outer-circumferential connecting/disconnecting teeth 48a of the first connecting/disconnecting sleeve 48 and the first inner-circumferential connecting/disconnecting teeth 38b of the first ring gear 38 are determined to be meshed with each other while the first piston 56 is latched on one of the latching teeth of the first holder 68. Therefore, while the first piston 56 is latched on one of the latching teeth of the first holder 68, the first connecting/disconnecting sleeve 48 is positioned at the first meshing position. In this case, the input shaft 34 and the first ring gear 38 are connected in a power transmittable manner, and the first clutch 24 is connected.

Furthermore, when the first drive current I1 is supplied to the first electromagnetic coil 72 again while the first piston 56 is latched on one of the latching teeth of the first holder 68, the first connecting/disconnecting sleeve 48 and the first piston 56 are moved to the front wheel 14L side again through the operation described above. When the current supply to the first electromagnetic coil 72 is stopped after the first piston 56 and the first connecting/disconnecting sleeve 48 are moved to the front wheel 14L side, the first piston 56 is moved to the front wheel 14R side by the urging force of the return spring 50, and the first piston 56 is latched on the other of the latching teeth formed on the first holder 68.

The first outer-circumferential connecting/disconnecting teeth 48a of the first connecting/disconnecting sleeve 48 and the first inner-circumferential connecting/disconnecting teeth 38b of the first ring gear 38 are determined to be released while the first piston 56 is latched on the other of the latching teeth of the first holder 68. Therefore, while the first piston 56 is latched on the other of the latching teeth of the first holder 68, the first connecting/disconnecting sleeve 48 is positioned at the first non-meshing position. In this case, the power transmission between the input shaft 34 and the first ring gear 38 is interrupted, and the connection of the first clutch 24 is disconnected. As described above, each time the current is supplied to the first electromagnetic coil 72 and the supply is stopped, the latching teeth of the first holder 68 for latching the first piston 56 are switched, and the first connecting/disconnecting sleeve 48 is moved to either the first meshing position or the first non-meshing position. Regarding a mechanism switching the latching teeth of the first holder 68 for latching the first piston 56 each time the first piston 56 moved to the front wheel 14L side is moved to the front wheel 14R side by the return spring 50, this mechanism is a known technique and is therefore will not be described.

Returning to FIG. 1, the rear-wheel drive-power distributing device 30 includes, in the power transmission path from the propeller shaft 28 to the left and right rear wheels 16L, 16R: a second ring gear 82 meshed with a drive pinion gear 80 coupled to the end portion of the propeller shaft 28 on the side of the rear wheels 16L, 16R; a cylindrical output shaft 90 supported rotatably around a second rotation axis C2 via bearings 86 and 88 by a unit case 84; a pair of a left electronic control coupling 92L and a right electronic control coupling 92R respectively transmitting to the left and right rear wheels 16L, 16R a torque output from the output shaft 90 toward the rear wheels 16L, 16R; and the second clutch 32 connecting/disconnecting a power transmission path between the second ring gear 82 and the output shaft 90.

In the left electronic control coupling 92L, when a third drive current (drive current) I3 is not supplied from the electronic control device 78, torque from the engine 12 is not transmitted to the rear wheel 16L. On the other hand, in the left electronic control coupling 92L, when the third drive current I3 is supplied from the electronic control device 78, the torque from the engine 12 is transmitted to the rear wheel 16L. The magnitude of this torque increases in proportion to the third drive current I3.

In the right electronic control coupling 92R, when a fourth drive current (drive current) I4 is not supplied from the electronic control device 78, the torque from the engine 12 is not transmitted to the rear wheel 16R. On the other hand, in the right electronic control coupling 92R, when the fourth drive current I4 is supplied from the electronic control device 78, the torque from the engine 12 is transmitted to the rear wheel 16R. The magnitude of this torque increases in proportion to the fourth drive current I4.

The second ring gear 82 is a bevel gear having helical teeth or a hypoid gear formed thereon, for example. The second ring gear 82 includes a cylindrically-shaped cylindrical portion 82a and second inner-circumferential connecting/disconnecting teeth 82b formed on a radially inner side of the cylindrical portion 82a. The second ring gear 82 is rotatably supported around the second rotation axis C2.

The output shaft 90 penetrates the inside of the cylindrical portion 82a of the second ring gear 82. The output shaft 90 is supported by the unit case 84 via the bearing 86 and the bearing 88 disposed on both sides in the second rotation axis C2 direction and thus rotated, thereby rotating around the second rotation axis C2.

The second clutch 32 includes a second connecting/disconnecting sleeve 94 having second outer-circumferential connecting/disconnecting teeth 94a that can be meshed with the second inner-circumferential connecting/disconnecting teeth 82b formed on the second ring gear 82, a coil-shaped return spring 96 urging the second connecting/disconnecting sleeve 94 in the second rotation axis C2 direction toward the rear wheel 16R, a second movement mechanism 98 moving the second connecting/disconnecting sleeve 94 in the second rotation axis C2 direction, and a second electromagnetic actuator 100 for driving the second movement mechanism 98.

The second connecting/disconnecting sleeve 94 has an inner circumferential portion spline-fitted to the output shaft 90. Therefore, the second connecting/disconnecting sleeve 94 is relatively non-rotatable, and relatively movable in the second rotation axis C2 direction, with respect to the output shaft 90. When the second connecting/disconnecting sleeve 94 is moved in the second rotation axis C2 direction to a position where the second outer-circumferential connecting/disconnecting teeth 94a are meshed with the second inner-circumferential connecting/disconnecting teeth 82b of the second ring gear 82 (hereinafter referred to as a second meshing position), the second ring gear 82 and the output shaft 90 are connected in a power transmittable manner. Therefore, the second meshing position of the second connecting/disconnecting sleeve 94 is a position at which the second clutch 32 is connected. When the second connecting/disconnecting sleeve 94 is moved in the second rotation axis C2 direction to a position where the meshing is released between the second outer-circumferential connecting/disconnecting teeth 94a and the second inner-circumferential connecting/disconnecting teeth 82b of the second ring gear 82 (hereinafter referred to as a second non-meshing position), the power transmission between the second ring gear 82 and the output shaft 90 is interrupted. Therefore, the second non-meshing position of the second connecting/disconnecting sleeve 94 is a position at which the second clutch 32 is disconnected.

The return spring 96 is interposed between the bearing 86 and the second connecting/disconnecting sleeve 94 in a preloaded state, and the second connecting/disconnecting sleeve 94 is urged by the return spring 96 in the second rotation axis C2 direction toward the rear wheel 16R.

The second movement mechanism 98 has a structure basically unchanged from that of the first movement mechanism 52 described above. The second movement mechanism 98 includes a second piston 102 disposed relatively rotatably, and relatively movably in the second rotation axis C2 direction, with respect to the output shaft 90, a second ball cam 104, and a second holder 106 provided with two types of latching teeth and fixed to the output shaft 90 relatively non-rotatably and relatively non-movably in the second rotation axis C2 direction to latch the second piston 102 with the latching teeth. The second movement mechanism 98 further includes a second synchronizing device 108 synchronizing rotation speed of the second connecting/disconnecting sleeve 94 and rotation speed of the second ring gear 82 in a transition period when the second connecting/disconnecting sleeve 94 moves from the rear wheel 16R side to the rear wheel 16L side.

The structure and operation of the second ball cam 104 are basically unchanged from those of the first ball cam 64 described above and therefore will not be described. The structure and operation of the second electromagnetic actuator 100 are basically unchanged from the first electromagnetic actuator 54 described above and therefore will not be described.

When a second drive current 12 is supplied to the second electromagnetic coil 110 of the second electromagnetic actuator 100 by the electronic control device 78 while the output shaft 90 is rotating around the second rotation axis C2 during running of the vehicle 10, the second ball cam 104 is actuated, so that the second connecting/disconnecting sleeve 94 and the second piston 102 are moved to the rear wheel 16L side against urging force of the return spring 96. When the supply of the second drive current 12 to the second electromagnetic coil 110 is stopped, the second connecting/disconnecting sleeve 94 and the second piston 102 are moved to the rear wheel 16R side by the urging force of the return spring 96. When the second piston 102 is moved to the rear wheel 16R side, the second piston 102 is latched on one of the latching teeth formed on the second holder 106.

The second outer-circumferential connecting/disconnecting teeth 94a of the second connecting/disconnecting sleeve 94 and the second inner-circumferential connecting/disconnecting teeth 82b of the second ring gear 82 are determined to be meshed with each other while the second piston 102 is latched on one of the latching teeth of the second holder 106. Therefore, while the second piston 102 is latched on one of the latching teeth of the second holder 106, the second connecting/disconnecting sleeve 94 is positioned at the second meshing position. In this case, the second ring gear 82 and the output shaft 90 are connected in a power transmittable manner.

Furthermore, when the second drive current 12 is supplied to the second electromagnetic coil 110 of the second electromagnetic actuator 100 while the second piston 102 is latched on one of the latching teeth of the second holder 106, the second connecting/disconnecting sleeve 94 and the second piston 102 are moved to the rear wheel 16L side. When the current supply to the second electromagnetic coil 110 of the second electromagnetic actuator 100 is stopped after the second connecting/disconnecting sleeve 94 and the second piston 102 are moved to the rear wheel 16L side, the second piston 100 is moved to the rear wheel 16R side, and the second piston 102 is latched on the other of the latching teeth formed on the second holder 106. The second outer-circumferential connecting/disconnecting teeth 94a of the second connecting/disconnecting sleeve 94 and the second inner-circumferential connecting/disconnecting teeth 82b of the second ring gear 82 are determined to be released while the second piston 102 is latched on the other of the latching teeth of the second holder 106. Therefore, while the second piston 102 is latched on the other of the latching teeth of the second holder 106, the second connecting/disconnecting sleeve 94 is positioned at the second non-meshing position. In this case, the power transmission between the second ring gear 82 and the output shaft 90 is interrupted, and the second clutch 32 is disconnected. As described above, each time switching is performed between the supply and the stop of supply of the current to the second electromagnetic coil 110 of the second electromagnetic actuator 100, the latching teeth of the second holder 106 for latching the second piston 102 is switched, and the second connecting/disconnecting sleeve 94 is moved to either the second meshing position or the second non-meshing position. Regarding a mechanism switching the latching teeth of the second holder 106 for latching the second piston 102 each time the second piston 102 moved to the rear wheel 16L side is moved to the rear wheel 16R side by the return spring 96, this mechanism is a known technique and is therefore will not be described.

Returning to FIG. 2, the driven pinion gear 36 meshed with the first ring gear 38 is disposed orthogonally with respect to the first ring gear 38. The driven pinion gear 36 is rotatably supported around a third rotation axis C3 by the transfer casing 42 via a pair of bearings 112 and 114. The first rotation axis C1 is orthogonal to the third rotation axis C3.

In the transfer casing 42, a gear chamber 116 housing the first ring gear 38 and the driven pinion gear 36 is formed. A predetermined amount of oil is stored in the gear chamber 116 of the transfer casing 42, and the gear portion of the driven pinion gear 36 is partially immersed in the oil. Therefore, when the driven pinion gear 36 rotates, the oil is scooped up, and the oil is supplied to components housed in the gear chamber 116.

During forward running of the vehicle 10, the driven pinion gear 36 rotates counterclockwise when viewed in the direction of an arrow A, and the oil is scattered in a direction indicated by a broken arrow. In the transfer casing 42, due to a restriction on space, a communication hole 120 allowing communication between the gear chamber 116 and a breather chamber 118 indicated by a broken line is provided at a position to which the oil scooped up by the driven pinion gear 36 is directed. Therefore, the oil may flow into the breather chamber 118 from the communication hole 120, and the oil may flow through a breather hole (not shown) communicating with the breather chamber 118. The bearings 112 and 114 rotatably supporting the driven pinion gear 36 on the transfer casing 42 are arranged at positions to which the oil scooped up by the driven pinion gear 36 is unlikely to scatter. On the other hand, the transfer casing 42 is provided with a lubricating oil passage 122 indicated by a dashed-dotted line for capturing the oil scooped up by the driven pinion gear 36 and supplying the oil to the bearings 112, 114. Therefore, the oil necessary for lubricating the bearings 112, 114 must flow into the lubricating oil passage 122. In FIG. 2, the lubricating oil passage 122 and a bolt 126 for fixing a cover 124 described later to the transfer casing 42 are shown at an overlapping position; however, the lubricating oil passage 122 is actually formed at a position avoiding the bolt 126.

To solve the problem, an oil receiver 128 is disposed for preventing the oil scooped up by the driven pinion gear 36 from flowing into the communication hole 120 and capturing and causing the oil scooped up by the driven pinion gear 36 to flow toward the lubricating oil passage 122. The structure and function of the oil receiver 128 will be described later.

Figure 3:
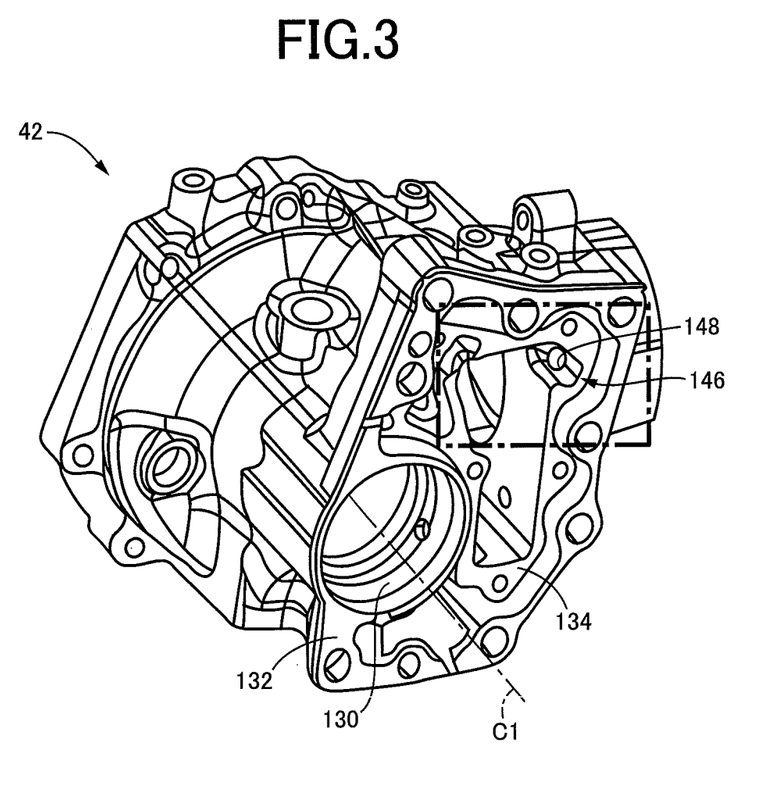
FIG. 3 is a perspective view of a transfer casing of FIG. 2, corresponding to a view of the transfer casing as viewed from the upper left.

The structure of the breather chamber 118 of FIG. 2 will be described. FIG. 3 is a perspective view of the transfer casing 42, corresponding to a view of the transfer casing 42 of FIG. 2 as viewed from the upper left. The front wheel axle 22R is fitted into a round hole 130 shown in FIG. 3. On the side where the round hole 130 is formed in the first rotation axis C1 direction of the front wheel axle 22, a first mating surface 132 and a second mating surface 134 are formed as flat surfaces perpendicular to the first rotation axis C1. A cover not shown is fastened to the first mating surface 132 by a bolt. The cover 124 shown in FIG. 2 is attached to the second mating surface 134 by the bolt 126, As shown in FIG. 2, the cover 124 is disposed at a position to which the oil scooped up by the driven pinion gear 36 is directed, and is attached perpendicularly to the first rotation axis C1 direction.

Figure 4:
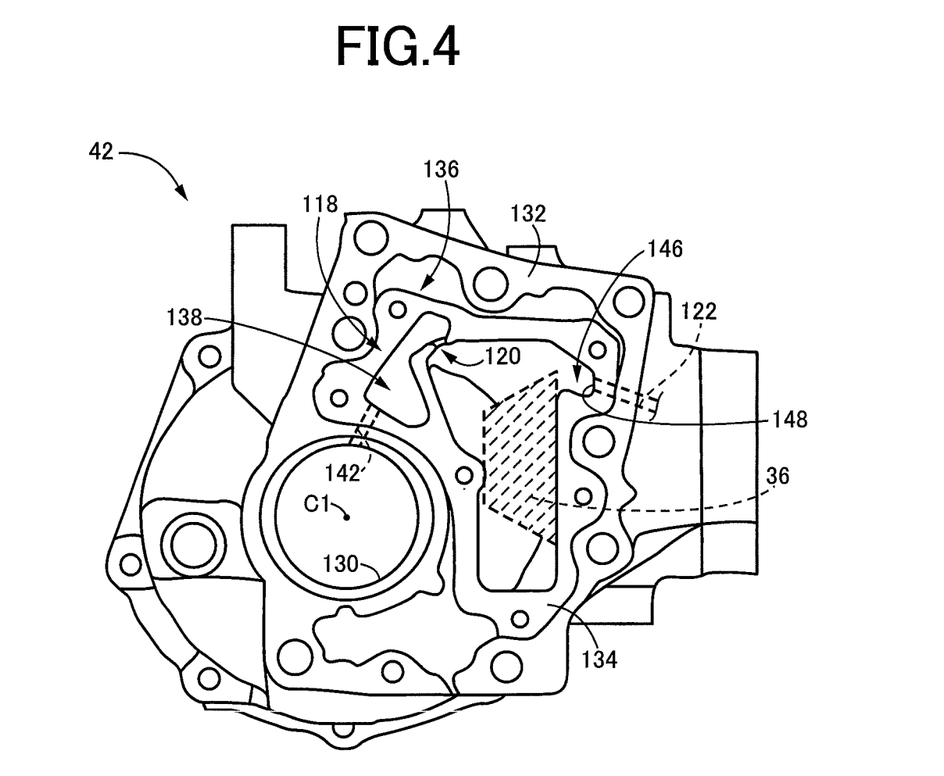
FIG. 4 is a view of the transfer casing of FIG. 3 as viewed in the direction perpendicular to a first mating surface and a second mating surface.

FIG. 4 corresponds to a view of the transfer casing 42 of FIG. 3 as viewed in the direction perpendicular to the first mating surface 132 and the second mating surface 134. In FIG. 4, the left side corresponds to the vehicle front side, the right side corresponds to the vehicle rear side, the upper side corresponds to the vertical upper side in a vehicle mounted state, and the lower side corresponds to the vertical lower side in the vehicle mounted state. The vehicle mounted state is on the assumption that the vehicle is on a flat road surface. A trapezoidal component indicated by broken lines in FIG. 4 corresponds to the driven pinion gear 36. When the driven pinion gear 36 rotates during forward running of the vehicle 10, the oil scooped up by the driven pinion gear 36 scatters toward the side provided with the second mating surface 134 (the near side on the plane of the figure).

A portion of a wall portion 136 of the transfer casing 42 provided with the second mating surface 134 has a predetermined thickness and is formed to partition the gear chamber 116 housing the driven pinion gear 36 etc. A recess portion 138 is formed on a wall surface of the wall portion 136 provided with the second mating surface 134, i.e., on a wall surface of the wall portion 136 on the opposite side of a wall surface facing the gear chamber 116. The recess portion 138 is a bottomed recess formed in the second mating surface 134 and is formed by casting or cutting. The recess portion 138 forms the breather chamber 118. Specifically, the cover 124 is attached to the second mating surface 134 provided with the recess portion 138, so that the breather chamber 118 is formed as a space surrounded by the recess portion 138 and the cover 124. As shown in FIG. 4, since the recess portion 138 is connected to the communication hole 120, the breather chamber 118 is in communication with the communication hole 120 formed in the wall portion 136. Therefore, the breather chamber 118 is in communication with the gear chamber 116 through the communication hole 120. The wall portion 136 corresponds to a partition wall of the present invention.

Figure 5:
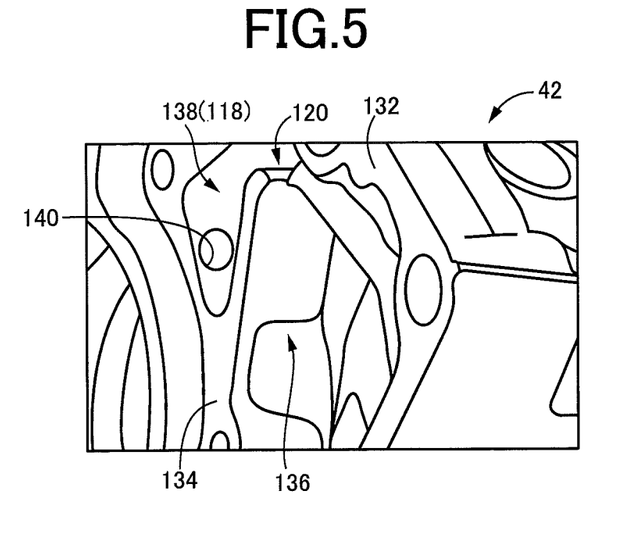
FIG. 5 is a perspective view of a portion where a breather chamber is formed in a wall portion provided with the second mating surface of FIG. 4.

FIG. 5 is a perspective view of a portion where the recess portion 138, i.e., the breather chamber 118, is formed in the wall portion 136 provided with the second mating surface 134 of FIG. 4. Since the recess portion 138 and the communication hole 120 are prepared in the wall portion 136 and the cover 124 is attached to the second mating surface 134, the breather chamber 118 and the communication hole 120 allowing communication between the breather chamber 118 and the gear chamber 116 are completely formed. The breather chamber 118 is connected to a breather hole not shown, and the breather chamber 118 communicates via the breather hole with the outside of the transfer casing 42. Therefore, when a pressure in the gear chamber 116 of the transfer casing 42 increases, the internal air of the transfer casing 42 is discharged through the breather chamber 118 and the breather hole to the outside, so that the pressure in the transfer casing 42 is adjusted. Additionally, an oil discharge hole 140 is formed on an inner wall surface of the wall portion 136 forming the recess portion 138. The oil discharge hole 140 is connected to one end of a connecting oil passage 142 indicated by broken lines in FIGS. 2 and 4. The other end of the connecting oil passage 142 is in communication with a space between an oil seal 144 and the bearing 44 shown in FIG. 2. Therefore, the oil flowing into the breather chamber 118 is discharged to the space through the oil discharge hole 140 and the connecting oil passage 142.

Figure 6:
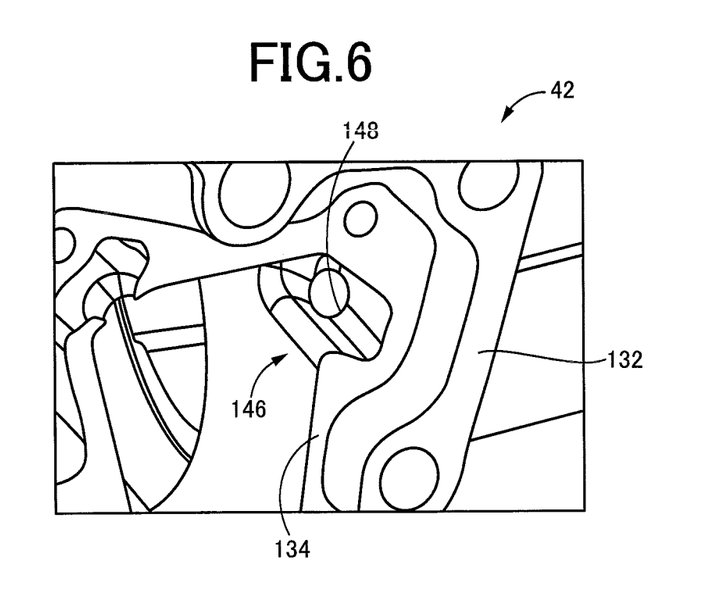
FIG. 6 is an enlarged view of a periphery of an oil receiving portion surrounded by a dashed-dotted line of FIG. 3.

The structure of the lubricating oil passage 122 for supplying oil to the bearing 112 and the bearing 114 rotatably supporting the driven pinion gear 36 will be described. An oil receiving portion 146 is formed on the vehicle rear side (right side on the plane of the figure) of the second mating surface 134 of the wall portion 136 shown in FIG. 4. The oil receiving portion 146 is provided with a lubricating oil passage inlet 148, and the oil captured by the oil receiving portion 146 flows from this lubricating oil passage inlet 148 into the lubricating oil passage 122. In this way, the oil receiving portion 146 is connected via the lubricating oil passage inlet 148 to the lubricating oil passage 122. FIG. 6 is an enlarged view of a periphery of the oil receiving portion 146 surrounded by a dashed-dotted line of FIG. 3. As shown in the FIG. 6, the oil receiving portion 146 is formed into a groove shape and is configured to receive oil when the oil receiving portion 146 is viewed from the second mating surface 134 side. The oil receiving portion 146 has a predetermined length along the direction of thickness of the wall portion 136. The oil captured by the oil receiver 128 (see FIGS. 9 and 10A and 10B) described later is stored in the oil receiving portion 146. Therefore, the oil receiving portion 146 is formed for receiving the oil captured by the oil receiver 128. In this example, the oil receiving portion 146 is formed by casting.

Figure 7:
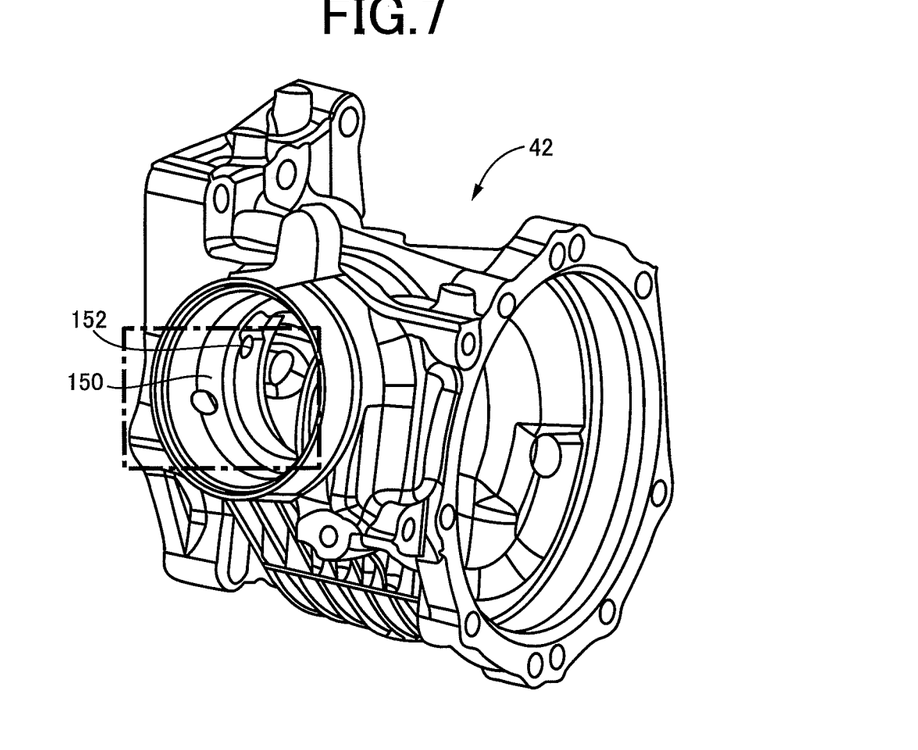
FIG. 7 is a perspective view of the transfer casing of FIG. 2 when viewed from the rear right.
Figure 8:
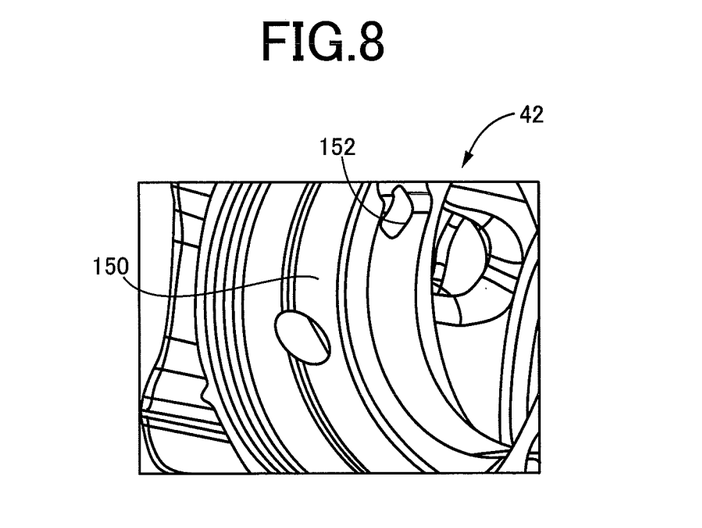
FIG. 8 is an enlarged view of a portion of the transfer casing surrounded by a dashed-dotted line of FIG. 7.

FIG. 7 is a perspective view of the transfer casing 42 of FIG. 2 when viewed from the rear right, and FIG. 8 is an enlarged view of a portion of the transfer casing 42 surrounded by a dashed-dotted line of FIG. 7. The driven pinion gear 36 is fitted in a round hole 150 of the transfer casing 42 shown in FIGS. 7 and 8 and is rotatably supported by the bearing 112 and the bearing 114. A lubricating oil passage outlet 152 is formed on an inner circumferential surface of the round hole 150. The lubricating oil passage outlet 152 is connected to the lubricating oil passage 122. Therefore, the oil stored in the oil receiving portion 146 flows from the lubricating oil passage inlet 148 into the lubricating oil passage 122 and flows out of the lubricating oil passage outlet 152 through the lubricating oil passage 122. The outflow oil lubricates the bearings 112 and 114 arranged near the lubricating oil passage outlet 152.

Figure 9:
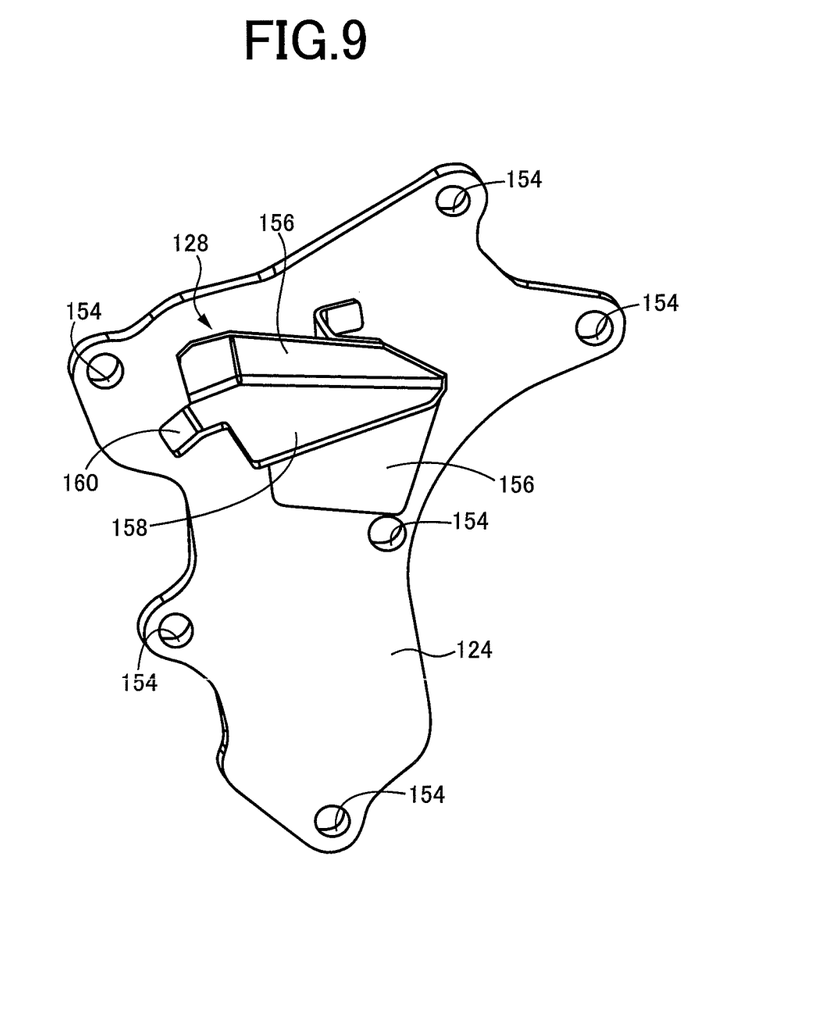
FIG. 9 is a perspective view of an oil receiver attached to the cover.
Figure 10A:
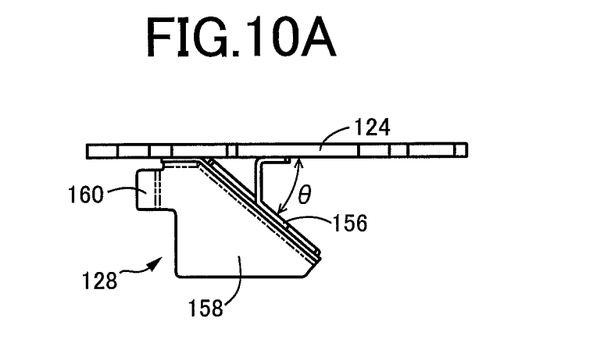
FIGS. 10A and 10B are views for explaining the structure of the oil receiver.
Figure 10B:
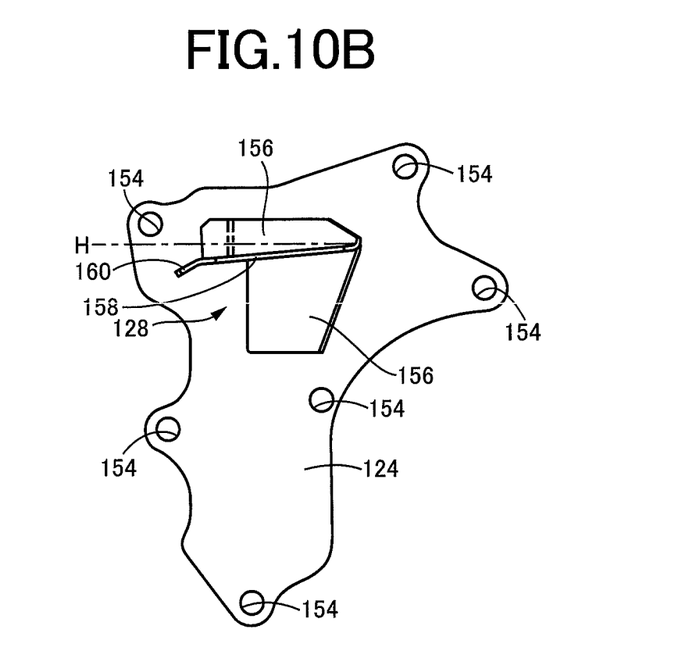

The structure of the oil receiver 128 will be described. FIG. 9 is a perspective view of the oil receiver 128 attached to the cover 124, and FIGS. 10A and 10B are views for explaining the structure of the oil receiver 128. In FIGS. 10A and 10B, FIG. 10A is a top view of the oil receiver 128 of FIG. 9 as viewed from above, and FIG. 10B is a front view of the oil receiver 128.

An edge of the cover 124 has multiple through-holes 154 formed for bolting the cover 124 to the second mating surface 134. The cover 124 is formed into the same shape as an outer edge of the second mating surface 134 shown in FIG. 4. Therefore, in a state in which the cover 124 is fastened to the second mating surface 134 by bolting (i.e., the vehicle mounted state), the second mating surface 134 is entirely covered by the cover 124. When the cover 124 is fastened to the second mating surface 134, the cover 124 serves as a partition between the gear chamber 116 and the outside of the transfer casing 42.

As shown in FIG. 2, in the vehicle mounted state, the oil receiver 128 is positioned in the gear chamber 116 side by side with the teeth of the driven pinion gear 36 in the first rotation axis C1 direction. Therefore, during forward running of the vehicle 10, the oil scooped up by the driven pinion gear 36 scatters toward the oil receiver 128.

As shown in FIG. 9, the oil receiver 128 has a vertical wall portion 156 preventing the oil scooped up by the driven pinion gear 36 from flowing into the communication hole 120 and a horizontal wall portion 158 capturing the oil scooped up by the driven pinion gear 36 and causing the captured oil to flow toward the lubricating oil passage 122. The vertical wall portion 156 and the horizontal wall portion 158 are each made up of a metal flat plate.

The vertical wall portion 156 is formed into a substantially trapezoidal shape when viewed in a direction perpendicular to the cover 124 and is extended in the vertical direction. The vertical wall portion 156 is disposed such that a wall surface thereof faces an outer circumferential teeth of the driven pinion gear 36, so that the oil scooped up by the driven pinion gear 36 and scattered toward the cover 124 is sprayed to the wall surface. As shown in FIG. 10A, the vertical wall portion 156 is inclined at a predetermined angle θ relative to the cover 124. Specifically, in FIG. 10A, the vertical wall portion 156 has a left end connected to the wall surface of the cover 124 and is inclined in the direction away from the wall surface of the cover 124 while extending toward the right side of the vertical wall portion 156. Since the vertical wall portion 156 is inclined with respect to the cover 124, the oil sprayed to the vertical wall portion 156 is guided along the wall surface of the vertical wall portion 156 to the side connected to the cover 124. The vertical wall portion 156 is connected to the wall surface of the cover 124 by welding.

In the vehicle mounted state, the communication hole 120 is disposed on the back side of the wall surface of the vertical wall portion 156 facing the driven pinion gear 36 (see FIG. 2).

The horizontal wall portion 158 is formed into a substantially triangular shape as shown in FIG. 10A and is extended perpendicularly from the wall surface of the vertical wall portion 156. In the vehicle mounted state, the horizontal wall portion 158 also extends toward the driven pinion gear 36 (see FIG. 2). At a left end of the horizontal wall portion 158, a guide portion 160 extending along the wall surface of the cover 124 is formed. As shown in FIG. 10B, when the horizontal wall portion 158 is viewed in a direction perpendicular to the cover 124, the horizontal wall portion 158 is inclined downward while extending toward the side provided with the guide portion 160. In the vehicle mounted state, the side of the horizontal wall portion 158 provided with the guide portion 160 is a position close to the oil receiving portion 146 (see FIG. 2). Therefore, when the horizontal wall portion 158 is viewed in a direction perpendicular to the cover 124 in the vehicle mounted state, the horizontal wall portion 158 is inclined downward relative to a horizontal line H while extending toward the side provided with the oil receiving portion 146.

The guide portion 160 is formed into a rectangular shape and projects parallel to the wall surface of the cover 124 from an end portion of the horizontal wall portion 158. The guide portion 160 is formed at a position at which an end portion thereof reaches the oil receiving portion 146 formed in the transfer casing 42 in the vehicle mounted state (see FIG. 2). As shown in FIG. 10B, when the guide portion 160 is viewed in a direction perpendicular to the cover 124, the guide portion 160 is inclined downward at an inclination angle larger than the inclination of the horizontal wall portion 158. Therefore, the oil moved to the guide portion 160 moves along the wall surface of the guide portion 160 to an end portion of the guide portion 160 and is delivered to the oil receiving portion 146 from the end portion.

The effect of the oil receiver 128 configured as described above will be described. During forward running of the vehicle, the oil scooped up by the driven pinion gear 36 scatters toward the cover 124 and the oil receiver 128. In this case, since the scattered oil hits on the vertical wall portion 156 of the oil receiver 128, the oil is prevented from flowing into the communication hole 120 located on the back side of the wall surface of the vertical wall portion 156 facing the driven pinion gear 36 (i.e., the wall surface to which the oil is sprayed). Even if the oil flows into the breather chamber 118, the oil is discharged from the oil discharge hole 140 through the connecting oil passage 142 to the space between the bearing 44 and the oil seal 144.

The oil sprayed to the wall surface of the vertical wall portion 156 located vertically above the horizontal wall portion 158 moves along the wall surface of the vertical wall portion 156 to the horizontal wall portion 158. Therefore, the oil sprayed to the vertical wall portion 156 is captured by the horizontal wall portion 158. Additionally, since the horizontal wall portion 158 is inclined downward with respect to the horizontal line H on the side provided with the guide portion 160, the oil moved to the horizontal wall portion 158 moves toward the guide portion 160 due to its own weight. Moreover, since the guide portion 160 extends toward the oil receiving portion 146 of the transfer casing 42, the oil moved to the guide portion 160 is guided by the guide portion 160 to the oil receiving portion 146 and flows to the oil receiving portion 146. Therefore, the oil captured by the horizontal wall portion 158 is guided to the oil receiving portion 146, and the oil is supplied via the oil receiving portion 146 and the lubricating oil passage inlet 148 to the lubricating oil passage 122. As a result, a flow rate of the oil flowing through the lubricating oil passage 122 increases, so that a flow rate of the oil supplied to the bearings 112 and 114 increases, and the bearings 112 and 114 are appropriately lubricated.

As described above, according to this example, even when the communication hole 120 allowing the breather chamber 118 to communicate with the gear chamber 116 is disposed at a position to which the oil scooped up by the driven pinion gear 36 is directed, the inflow of oil to the communication hole 120 is blocked by the vertical wall portion 156, so that the scooped oil is prevented from flowing out through the communication hole 120. Additionally, since the scooped oil is captured by the horizontal wall portion 158 and the captured oil is supplied to the lubricating oil passage 122, an amount of the oil flowing through the lubricating oil passage 122 can be ensured.

According to this example, the oil captured by the horizontal wall portion 158 is guided by the guide portion 160 and stored in the oil receiving portion 146 formed in the transfer casing 42. Therefore, the captured oil can efficiently be supplied to the lubricating oil passage 122.

Although the example of the present invention has been described in detail with reference to the drawings, the present invention is also applicable to other forms.

For example, in the example described above, the breather chamber 118 is formed by attaching the cover 124 to the second mating surface 134 provided with the recess portion 138; however, the present invention is not necessarily limited thereto. The present invention may be applied as long as the breather chamber 118 has a structure partitioned from the gear chamber 116 and allowed to communicate with the gear chamber 116 through the communication hole 120.

In the example described above, the oil receiving portion 146 is molded integrally with the transfer casing 42 by casting; however, the present invention is not necessarily limited thereto, and the oil receiving portion 146 may be formed by cutting. Alternatively, the oil receiving portion 146 may be formed by fixing a groove-shaped member to the transfer casing 42 by welding or screwing.

In the example described above, the vertical wall portion 156 is formed into a substantially trapezoidal shape when viewed in a direction perpendicular to the wall surface of the cover 124; however, the vertical wall portion 156 is not necessarily limited to the substantially trapezoidal shape. In short, the shape may appropriately be changed as long as the vertical wall portion 156 has a structure receiving the oil scattered toward the oil receiver 128 to block the inflow of the oil into the communication hole 120 located on the back side of the vertical wall portion 156. Although the horizontal wall portion 158 has the wall surface formed into a substantially triangular shape, the present invention is not necessarily limited thereto. In short, the shape may appropriately be changed as long as the oil can be captured.

In the example described above, the vertical wall portion 156 is inclined relative to the cover 124 at the predetermined angle θ; however, the vertical wall portion 156 may not be inclined relative to the cover 124.

The above description is merely an embodiment and the present invention can be implemented in variously modified and improved forms based on the knowledge of those skilled in the art.

REFERENCE SIGNS LIST

26: transfer (vehicle transfer)
36: driven pinion gear (pinion gear)
38: first ring gear (ring gear)
42: transfer casing
112: bearing
114: bearing
116: gear chamber
118: breather chamber
120: communication hole
122: lubricating oil passage
124: cover
128: oil receiver
136: wall portion (partition wall)
138: recess portion
146: oil receiving portion
156: vertical wall portion
158: horizontal wall portion
160: guide portion

What is claimed is:

1. A vehicle transfer comprising: a ring gear and a pinion gear orthogonally arranged and meshed with each other for transmitting a power; a transfer casing housing the ring gear and the pinion gear and enclosing an oil; and a bearing rotatably supporting the pinion gear on the transfer casing, wherein the transfer casing includes therein a breather chamber that is partitioned by a partition wall with respect to a gear chamber housing the pinion gear and that is allowed to communicate with the gear chamber through a communication hole formed in the partition wall to adjust a pressure in the transfer casing, and a lubricating oil passage for supplying the oil to the bearing, wherein the communication hole is disposed at a position to which the oil scooped up by the pinion gear is directed, the vehicle transfer includes an oil receiver including a vertical wall portion preventing the oil scooped up by the pinion gear from flowing into the communication hole and a horizontal wall portion capturing the oil scooped up by the pinion gear and causing the captured oil to flow toward the lubricating oil passage, and along a longitudinal axis of the vehicle transfer, the communication hole, the vertical wall portion and the pinion gear are disposed, in this order.

2. The vehicle transfer according to claim 1, wherein the transfer casing is provided with an oil receiving portion connected to the lubricating oil passage and receiving the oil captured by the horizontal wall portion, and wherein the horizontal wall portion is provided with a guide portion guiding the captured oil to the oil receiving portion.

3. The vehicle transfer according to claim 2, wherein the horizontal wall portion is inclined downward relative to a horizontal line as the horizontal wall portion extends toward the side provided with the guide portion.

4. The vehicle transfer according to claim 1, wherein the oil receiver is disposed on a cover disposed at the position to which the oil scooped up by the pinion gear is directed, wherein the vertical wall portion is disposed to face the pinion gear, wherein the communication hole is located on a back side of a wall surface of the vertical wall portion facing the pinion gear, and wherein the horizontal wall portion is extended perpendicularly from the wall surface of the vertical wall portion.

5. The vehicle transfer according to claim 2, wherein the oil receiver is disposed on a cover disposed at the position to which the oil scooped up by the pinion gear is directed, wherein the vertical wall portion is disposed to face the pinion gear, wherein the communication hole is located on a back side of a wall surface of the vertical wall portion facing the pinion gear, and wherein the horizontal wall portion is extended perpendicularly from the wall surface of the vertical wall portion.

6. The vehicle transfer according to claim 3, wherein the oil receiver is disposed on a cover disposed at the position to which the oil scooped up by the pinion gear is directed, wherein the vertical wall portion is disposed to face the pinion gear, wherein the communication hole is located on a back side of a wall surface of the vertical wall portion facing the pinion gear, and wherein the horizontal wall portion is extended perpendicularly from the wall surface of the vertical wall portion.

7. The vehicle transfer according to claim 4, wherein the breather chamber is formed by being surrounded by a recess portion that is formed in a wall surface of the partition wall on a back side of a wall surface facing the gear chamber and that is connected to the communication hole and the cover attached to the wall surface on the back side.

8. The vehicle transfer according to claim 5, wherein the breather chamber is formed by being surrounded by a recess portion that is formed in a wall surface of the partition wall on a back side of a wall surface facing the gear chamber and that is connected to the communication hole and the cover attached to the wall surface on the back side.

9. The vehicle transfer according to claim 6, wherein the breather chamber is formed by being surrounded by a recess portion that is formed in a wall surface of the partition wall on a back side of a wall surface facing the gear chamber and that is connected to the communication hole and the cover attached to the wall surface on the back side.

10. The vehicle transfer according to claim 1, wherein the vertical wall portion is disposed such that a wall surface thereof extends obliquely and faces outer circumferential teeth of the pinion gear.

11. The vehicle transfer according to claim 1, wherein when viewed in a direction perpendicular to a first mating surface and a second mating surface, the first mating surface and the second mating surface each provided as a flat surface perpendicular to a rotation axis of a front wheel axle of a vehicle to which the vehicle transfer is incorporated, the communication hole is disposed so as to face the pinion gear.

* * * * *